United States Patent [19]

Hill

[11] 3,846,561

[45] Nov. 5, 1974

[54] YOGURT-CONTAINING DOUGH COMPOSITION AND BAKED PRODUCT MADE THEREFROM

[76] Inventor: Larry G. Hill, 5110 N.E. 17 Ave., Ft. Lauderdale, Fla. 33308

[22] Filed: Aug. 7, 1972

[21] Appl. No.: 278,207

[52] U.S. Cl. .................... 426/19, 426/62, 426/152, A21d/236
[51] Int. Cl. ...................... A21d 2/34, A21d 13/04
[58] Field of Search ............. 99/86, 90, 92; 426/19, 426/62, 152

[56] References Cited
OTHER PUBLICATIONS

"Bird-of-Paradise Bread," Recipes: A Quintet of Cuisines, Foods of the World Series, Time-Life Books, 1970, pages 110–111.

Perkins, "Boston Cooking School Cookbook," pages 12 and 306, 10th Edition, 1959.

Tselementes, "Greek Cookery," page 208, 1952.

*Primary Examiner*—James R. Hoffman
*Attorney, Agent, or Firm*—Cooper, Dunham, Clark, Griffin & Moran

[57] ABSTRACT

A baked goods product, such as bread, having improved flavor and other properties is obtained by incorporating yogurt in the dough from which the baked goods product is prepared. The amount of yogurt incorporated in the dough composition is usually a minor amount, such as an amount in the range from about 1.0 percent by weight up to about 10 percent by weight or more, e.g., about 7.5 percent based on the flour content of the dough composition.

10 Claims, No Drawings

YOGURT-CONTAINING DOUGH COMPOSITION AND BAKED PRODUCT MADE THEREFROM

This invention relates to dough compositions and baked goods products prepared therefrom. More particularly, this invention in one of its embodiments is directed to a dough composition useful for the preparation therefrom of a baked goods product, such as bread, having improved physical properties and flavor.

In a very special embodiment of the practice of this invention there is produced a bread dough composition and bread prepared therefrom which possesses improved flavor and aroma chacteristics and physical properties as well as enhanced nutritive values.

The preparation and baking of dough compositions useful for the baking of bread is an old art. Various materials have been suggested for incorporation in bread dough compositions. One special dough composition and the bread made therefrom, viz. sourdough bread, has enjoyed wide acceptance because of its special taste and physical properties as well as its special nutritive values. Also, various procedures and dough compositions have been proposed for the preparation of dough and baked goods, such as bread made therefrom, see particularly U.S. Pat. Nos. 862,962, 1,894,135, 2,018,394, 3,015,565, 3,031,306, 3,404,983 and 3,566,807. The disclosures of the above-identified patents, particularly with respect to the bread dough compositions and the baked products, e.g., bread, made therefrom are herein incorporated and made part of this disclosure.

The bread-making industry is interested in making and selling bread having attractive taste, appearance and improved nutritive values.

Accordingly, it is an object of this invention to provide dough compositions useful for the preparation therefrom of a baked product having improved physical properties and attractive or interesting taste, aroma and appearance.

It is a special object of this invention to provide a dough composition and bread produced therefrom having enhanced nutritive values and attractive taste, appearance and aroma. In one special embodiment of the practices of this invention it is proposed to produce a bread which is distinctive not only due to the composition of the dough from which the bread is prepared but also because of its attractive taste, appearance and aroma.

How these and other objects of this invention are achieved will become apparent in the light of the accompanying disclosure. In at least one embodiment of the practice of this invention at least one of the foregoing objects will be achieved.

It has now been discovered that when yogurt, preferably fresh whole yogurt, is incorporated in a dough composition and the resulting yogurt-containing dough baked, such as in the manufacture of bread and other or similar baked goods, there is produced a baked product having an enhanced and/or attractive flavor, taste and aroma and improved nutritive value. The yogurt is incorporated in dough compositions in a minor amount, usually in the range 0.5–10 percent by weight based on the flour content, e.g., in the range 1–4 to 5 percent, such as 3.25 percent, or 7.5 percent. Dough compositions containing up to about 20 percent yogurt and higher may also be prepared, e.g., doughs for sour French breads.

Yogurt is a fermented dairy or milk product of obscure origin. Yogurt on a commercial basis is made from milk, usually from milk wherein the solids are concentrated by the evaporation of some water and the addition of skim milk solids. After inoculation with the organism Streptococcus thermophilus or the organism Lactobacillus bulgaricus there is produced a fermented milk product having the consistency resembling that of custard. The preparation of yogurt is described in U.S. Pat. No. 3,025,164. The disclosures of this patent with respect to the preparation of yogurt and the various types of yogurt compositions are herein incorporated and made part of this disclosure.

The practice of this invention, i.e., the incorporation of yogurt in dough compositions and the manufacture of baked products therefrom, is generally applicable to all flour-containing dough compositions, and is especially applicable to bread dough compositions.

Bread dough compositions comprise essentially flour, yeast and water together with other ingredients which may be added to improve texture, flavor, taste, aroma and the like. Various materials other than flour and yogurt in accordance with this invention may be included in dough compositions, particularly bread dough compositions. Such other materials include sugar (sucrose), usually added in the form of a syrup, honey, corn syrup solids or corn syrup, maltose, shortening, salt, milk, milk solids, wheat germ, dough improvers, such as compositions containing calcium sulfate, ammonium chloride, potassium bromate, salt and starch, egg white or egg white solids, whole egg or whole egg solids and other materials. In general, the amounts and the incorporation of these other materials are determined by the quality and flavor and texture and other physical properties desired in the resulting baked product.

Specific dough compositions containing yogurt in accordance with this invention include dough and frozen dough compositions employed for the manufacture of white bread, brown bread, rye bread, sourdough bread, raisin bread, corn bread, whole wheat bread, croutons, crackers, toasts, pumpernickle, so-called English muffins, rolls, cakes and cookies and snacks and the like.

For the most part the flour employed in the preparation of the dough for such baked products and breads such as brown bread, rye bread and the like, characterizes the resulting baked (bread) product. For example, rye flour is employed for the preparation of rye bread.

The yogurt may be incorporated in the dough in the desired amount directly, as in the preparation of a straight dough, or may be added in portions, such as in the sponge dough technique or process for the manufacture of bread. In the preparation of a so-called straight dough all the ingredients for the finished dough composition, including the yogurt, are incorporated into the dough at one time. The practice of this invention is particularly applicable to the preparation of a straight dough, i.e., the preparation of dough wherein all the dough ingredients are incorporated therein at one time.

The following is an example of the practice of this invention directed to the preparation of a yogurt-containing bread dough composition and the baking of the resulting dough into bread loaves.

Example

A straight dough having the following composition was prepared:

| Ingredients | % By Weight* |
|---|---|
| Patent Flour | 32.5 |
| Clear Flour | 67.5 |
| Water | 50 |
| Yeast | 2.5 |
| Yeast Food | .625 |
| Shortening | 3.25 |
| Sugar | 3.75 |
| Salt | 2.50 |
| Powdered Milk | 3.75 |
| N/D Malt Syrup | 2.50 |
| Wheat Germ | 2.50 |
| Honey | 7.50 |
| Fresh Yogurt | 7.50 |

*The percents by weight of the non-flour ingredients as indicated in the above table are based on the flour content of the dough.

As indicated, all the ingredients were incorporated into the batch at one time employing a horizontal type dough mixer. The resulting dough preparation was mixed for about 2 minutes at low speed and about 4 minutes at high speed. The prepared dough was then scaled using a standard divider and then run through a standard molder where the loaf was formed. Proofing was carried out by use of a standard steam-heated proof box and the dough was baked at the desired temperature, about 425°F., for about 25 minutes to produce the finished loaf. In the baking operation any standard type tunnel, double lap or reel, oven can be employed.

The resulting produced bread possessed an attractive and interesting taste, flavor and aroma in addition to having enhanced nutritive values due to the incorporation of the yogurt into the dough composition. In the practice of this invention the yogurt incorporated in the dough composition is fresh whole yogurt, preferably not containing any fruit flavoring or vitamins or other chemical additives.

As will be apparent to those skilled in the art in the light of the foregoing many modifications, alterations and changes are possible in the practice of this invention without departing from the spirit or scope thereof.

I claim:

1. A bread dough composition consisting essentially of flour, water, yeast and yogurt, said yogurt being present in said bread dough composition in an amount in the range from about 0.5 to about 20.0 percent by weight based on the flour content of said dough composition.

2. A baked bread product prepared from the dough composition of claim 1.

3. A dough composition in accordance with claim 1 consisting essentially of flour, water, yeast, vegetable shortening, sugar, salt, powdered milk, malt syrup, wheat germ, honey and fresh yogurt, the amount of said yogurt being present in said dough composition in an amount in the range 0.5–20.0 percent by weight based on the flour content of said dough composition.

4. A dough composition in accordance with claim 1 wherein said dough composition is a sourdough.

5. A dough composition in accordance with claim 1 wherein said dough composition is rye dough composition.

6. A dough composition in accordance with claim 1 wherein said dough composition is brown bread dough composition.

7. A dough composition in accordance with claim 1 wherein said dough composition is raisin bread dough composition.

8. A dough composition in accordance with claim 1 wherein said dough composition is whole wheat bread dough composition.

9. A dough composition in accordance with claim 1 wherein said dough composition is a corn bread dough composition.

10. A process for preparing bread which comprises forming a dough composition admixture consisting essentially of flour, water, yeast and yogurt, said yogurt being present in an amount in the range from about 0.5 to about 20.0 percent by weight based on the flour content of said dough composition admixture, the aforesaid components of said dough composition admixture being incorporated therein at one time to form said dough composition admixture and baking the resulting dough composition to prepare said bread.

* * * * *